A. MARTIN & O. D. CHARLES.
MILK PAIL.
APPLICATION FILED MAR. 26, 1912.

1,044,552.

Patented Nov. 19, 1912.

WITNESSES:
F. C. Matheny
E. Peterson

INVENTORS:
Albert Martin and
Ora D. Charles
BY
Pierre Barnes
ATTORNEY

UNITED STATES PATENT OFFICE.

ALBERT MARTIN AND ORA D. CHARLES, OF MONOHAN, WASHINGTON.

MILK-PAIL.

1,044,552.  Specification of Letters Patent.  Patented Nov. 19, 1912.

Application filed March 26, 1912. Serial No. 686,394.

*To all whom it may concern:*

Be it known that we, ALBERT MARTIN and ORA D. CHARLES, citizens of the United States, residing at Monohan, in the county of King and State of Washington, have invented certain new and useful Improvements in Milk-Pails, of which the following is a specification.

The object of this invention is the improvement in the construction of milk pails to render the same more sanitary than other pails hitherto in use and without sacrificing their utility or the convenience of the milker.

With this end in view the invention consists in the novel construction and adaptation of devices, as will be hereinafter described and claimed.

Figure 1:
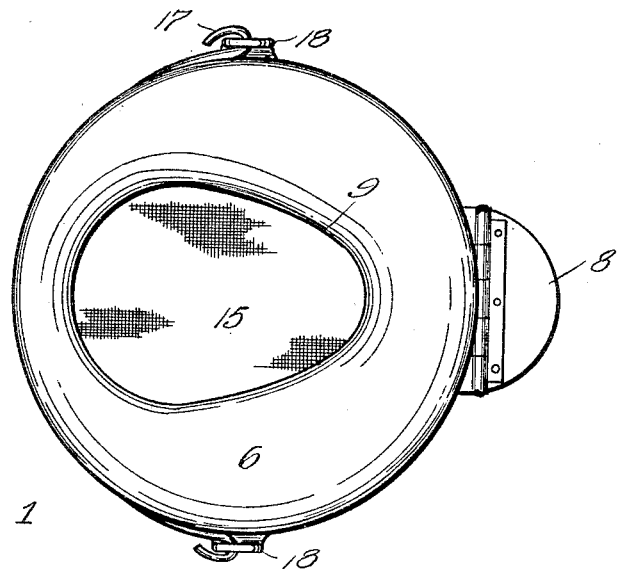
Figure 2:
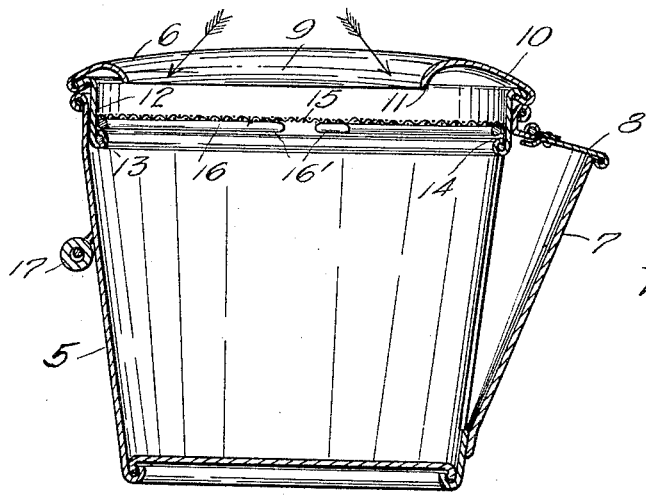
Figure 3:
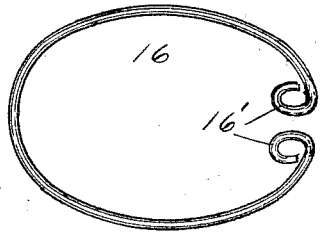

In the accompanying drawings, Figure 1 is a plan view of a milk pail embodying our invention. Fig. 2 is a transverse vertical section thereof. Fig. 3 is a perspective view of the screen securing ring, shown detached.

The reference numeral 5 designates the body of a milk pail and 6 the cover therefor. The pail body is preferably constructed with a spout 7 having a hinged lid 8. The cover 6 is provided with a substantially oval-shaped opening 9 having its major axis disposed diametrically with respect to the cover. From a short distance of the margin of the said opening, the cover structure is sloped downwardly, as at 10, to the periphery which protrudes outside of the pail body. About said opening the cover is formed with a downwardly directed lip 11. Provided on said cover is a pendent flange 12 adapted to make a close fit within the mouth of the pail body. The lower edge of the flange 12 is turned inwardly and about a reinforcing wire 13 and furnishing an annular shelf 14 interiorly of the cover flange. 15 represents a screen of fine woven cloth, or an equivalent, which is supported upon said shelf and detachably held thereat by means of an elastic expanding hoop 16 which engages the edges of the screen and bearing against the inside of said flange.

As best shown in Fig. 3, the hoop 16 is formed with hooked ends 16' to enable the operator to conveniently draw the ends together for contracting the size of the hoop when the same is to be introduced with the screen into engaged position with the cover flange 12, or when removing the same therefrom for cleaning the cloth.

17 represents a bail which is secured to the pail body by ears 18, as customary.

In using a pail of the aforedescribed character, the milker puts the same below the cow so as to locate the opening underneath the animal's teats, or nearly so. He then draws the milk in the usual manner and directs the teats as employed to deliver the milk through the cover opening 9 upon the screen 15 through which it is strained and falls into the pail body therebelow.

By suitably manipulating the teats the milker can direct the streams of milk therefrom in inclined directions, as indicated by arrows in Fig. 2, so as to strike the screen at angles below the lip 11 and whereby the spatter of the milk from the screen is arrested by encountering the underside of the cover surrounding the opening and thus save a portion of the milk which would otherwise be wasted. The dirt, insects, etc., falling from the cow upon the top of the cover are prevented thereby from getting upon the screen and mixing with the milk or at least from clogging the screen.

The screen is removed with the cover and may be detached for washing by withdrawing the hoop 16.

What we claim, is—

A milk pail cover comprising a top provided with a substantially oval-shaped opening having its major axis disposed diametrically with respect to the cover, a peripheral depending flange carried by the top having an inwardly and upwardly turned lower edge constituting a shelf, a screen mounted on said shelf and detachably-secured thereon, and a downwardly and inwardly directed lip carried by the top and surrounding the opening in the latter.

Signed at Issaquah, Wash., this 19th day of March 1912.

ALBERT MARTIN.
ORA D. CHARLES.

Witnesses:
LORENZO FRANCIS,
RALPH DARST.

Copies of this patent may be obtained for five cents each, by addressing the "Commissioner of Patents, Washington, D. C."